(12) United States Patent
Kray et al.

(10) Patent No.: US 9,976,429 B2
(45) Date of Patent: May 22, 2018

(54) COMPOSITE DISK

(71) Applicant: General Electric Company, Schenectady, NY (US)

(72) Inventors: Nicholas Joseph Kray, Mason, OH (US); Baskaran Bhuvaraghan, Bangalore (IN); Nitesh Jain, Bangalore (IN)

(73) Assignee: General Electric Company, Schenectady, NY (US)

(*) Notice: Subject to any disclaimer, the term of this patent is extended or adjusted under 35 U.S.C. 154(b) by 283 days.

(21) Appl. No.: 14/734,091

(22) Filed: Jun. 9, 2015

(65) Prior Publication Data
US 2016/0362990 A1 Dec. 15, 2016

(51) Int. Cl.
*F01D 5/30* (2006.01)
*B29C 70/34* (2006.01)
(Continued)

(52) U.S. Cl.
CPC .......... *F01D 5/3023* (2013.01); *B29C 70/345* (2013.01); *B29C 70/48* (2013.01);
(Continued)

(58) Field of Classification Search
CPC . F01D 5/028; F01D 5/02; F01D 5/282; F04D 29/329; F05D 2300/603;
(Continued)

(56) References Cited

U.S. PATENT DOCUMENTS 3,519,368 A 7/1970 Howald
3,610,777 A 10/1971 Wagle
(Continued)

FOREIGN PATENT DOCUMENTS

EP 0277906 A2 10/1998
EP 1396608 A2 10/2004
(Continued)

OTHER PUBLICATIONS

English translation of FR 2504209.*
(Continued)

*Primary Examiner* — Ninh H Nguyen
*Assistant Examiner* — Topaz L Elliott
(74) *Attorney, Agent, or Firm* — General Electric Company; Brian P. Overbeck

(57) ABSTRACT

A gas turbine engine composite disk includes dovetail slots between disk posts extending radially inwardly from a periphery, a hub ring of composite plies circumscribed about a centerline axis, and radial plies extending radially away from hub ring into disk posts. A segmented intermediate ring concentric with and located radially outwardly of hub ring includes intermediate ring segments having nested plies with annular bases circumscribed about centerline axis and substantially radially extending clockwise and counter-clockwise radial ply arms. An outer segmented ring may be concentric with and located radially outwardly of intermediate ring, include annular outer ring segments with circumferentially stacked composite plies disposed within intermediate ring segments between clockwise and counter-clockwise radial ply arms and radially outwardly of annular bases. An outer skin of outermost composite covering plies may extend circumferentially around composite disk. Circumferential and radial composite plies may include circumferentially and radially oriented fibers.

20 Claims, 4 Drawing Sheets

(51) Int. Cl.
    *B29D 99/00*     (2010.01)
    *B29C 70/48*     (2006.01)
    *F01D 5/02*     (2006.01)
    *F01D 5/28*     (2006.01)

(52) U.S. Cl.
    CPC ......... *B29D 99/0025* (2013.01); *F01D 5/028* (2013.01); *F01D 5/282* (2013.01); *F01D 5/3007* (2013.01); *F05D 2220/36* (2013.01)

(58) Field of Classification Search
    CPC .......... F05D 2300/614; B29D 99/0017; B29D 99/0032; B29K 2105/14; B29B 11/16
    USPC ....................................................... 428/113
    See application file for complete search history.

(56) References Cited

U.S. PATENT DOCUMENTS

| | | | |
|---|---|---|---|
| 3,765,796 A | 10/1973 | Stargardtter et al. | |
| 4,465,434 A * | 8/1984 | Rourk | F01D 5/282 |
| | | | 416/230 |
| 4,648,802 A * | 3/1987 | Mack | F01D 5/046 |
| | | | 415/205 |
| 4,717,610 A | 1/1988 | Dannison | |
| 4,747,900 A | 5/1988 | Angus | |
| 4,786,347 A | 11/1988 | Angus | |
| 4,992,317 A * | 2/1991 | Chess | B29C 70/543 |
| | | | 156/93 |
| 5,222,866 A | 6/1993 | Labrouche et al. | |
| 5,378,110 A | 1/1995 | Ress, Jr. | |
| 5,632,600 A | 5/1997 | Hull | |
| 5,921,754 A | 7/1999 | Freitas et al. | |
| 6,213,720 B1 | 4/2001 | Farmer | |
| 6,290,466 B1 | 9/2001 | Ravenhall et al. | |
| 6,991,433 B2 | 1/2006 | Mons | |
| 7,491,032 B1 | 2/2009 | Powell et al. | |
| 7,918,644 B2 | 4/2011 | Schreiber | |
| 8,065,799 B2 * | 11/2011 | Fabre | B22F 5/106 |
| | | | 228/165 |
| 8,206,096 B2 * | 6/2012 | Prentice | F01D 5/282 |
| | | | 415/191 |
| 8,475,895 B2 * | 7/2013 | Xie | F01D 25/005 |
| | | | 415/170.1 |
| 8,905,719 B2 * | 12/2014 | Kray | F01D 9/042 |
| | | | 416/230 |
| 2005/0129514 A1 | 6/2005 | Mons et al. | |
| 2010/0129227 A1 | 5/2010 | Schilling et al. | |
| 2011/0154631 A1 | 6/2011 | Demania et al. | |
| 2013/0064668 A1 * | 3/2013 | Paige, II | F01D 5/284 |
| | | | 416/219 R |
| 2013/0251939 A1 * | 9/2013 | Kleinow | B32B 18/00 |
| | | | 428/121 |
| 2014/0113088 A1 * | 4/2014 | Goering | F01D 21/045 |
| | | | 428/34.5 |
| 2015/0098834 A1 | 4/2015 | O'Neill | |

FOREIGN PATENT DOCUMENTS

| | | | | |
|---|---|---|---|---|
| FR | 2504209 A1 * | 10/1982 | ............ | F01D 5/282 |
| JP | S52-077908 A | 6/1977 | | |
| JP | 2001-301072 A | 10/2001 | | |
| JP | 2011-033030 A | 2/2011 | | |
| JP | 2013-050105 A | 3/2013 | | |

OTHER PUBLICATIONS

European Search Report and Opinion issued in connection with corresponding EP Application No. 6173749.9 dated Nov. 2, 2016.
Notification of Reasons for Refusal issued in connection with corresponding JP Application No. 2016-110525 dated Jun. 27, 2017.
Search Report issued in connection with corresponding JP Application No. 2016-110525 dated Jun. 29, 2017.

* cited by examiner

COMPOSITE DISK

BACKGROUND OF THE INVENTION

Field of the Invention

The invention relates to gas turbine engine rotor disks and, particularly, to rotor disks used in the gas turbine engine fan and the booster stages.

Description of Related Art

Gas turbine engine metallic rotor disks are generally used to hold blades. The rotor disks in the fan and the booster stages carry significant centrifugal radial forces and, therefore, often have axial slots for blade retention. The radial forces generate both radial and tangential stresses during engine operation. In addition, fan blade out FBO or blade-out events can introduce high loads. The relatively heavy weight of the metallic rotor disks increase the loading and stresses.

Composite integrally bladed rotors for use in gas turbine engines have been disclosed in several patents such as U.S. Pat. Nos. 4,747,900, 4,786,347, and 7,491,032. Composite integrally bladed rotors are subject to large forces which must be taken into account in designing the construction of the rotor to preserve its integrity. In the rotor disk area, the major forces are exerted in circumferential directions so an ability to absorb hoop stress is important, whereas, in the airfoil blades radially exerted forces predominate. Composite material used in such rotors typically include a resin (such as epoxy) which has low inherent strength. The composite material has a specific strength higher than that of metal due to the inclusion of fibers normally of the same material embedded in a matrix of the composite material. The fibers are known to be strongest in tension so the direction of the forces in the finished component will, at least in part, determine its strength.

It is highly desirable to have a design for and method for manufacturing light-weight, strong, and easy to manufacture gas turbine rotor disks. It is also desirable to have a rotor with easy to assemble and disassemble composite blades. It is also desirable to have an easy to service rotor with composite blades that can be individually serviced if one is damaged.

SUMMARY OF THE INVENTION

A gas turbine engine composite disk includes dovetail slots between disk posts extending radially inwardly from a radially outer periphery of the composite disk, a hub ring of composite plies circumscribed about a centerline axis, and radial plies extending radially away from the hub ring and into the disk posts. The composite plies may be wrapped in a spiral or the composite plies may be concentric, annular, and circular in cross-section.

The composite disk may further include an outer skin with one or more outermost composite covering plies extending circumferentially around the composite disk, covering the disk posts, and bounding the dovetail slots therebetween.

The composite disk may include a segmented intermediate ring concentric with and located radially outwardly of the hub ring and include annular intermediate ring segments. Each of the intermediate ring segments includes nested plies and each of the nested plies includes an annular base circumscribed about the centerline axis and substantially radially extending clockwise and counter-clockwise radial ply arms at clockwise and counter-clockwise ends of the annular base wherein the radial plies include the clockwise and counter-clockwise radial ply arms.

The composite disk may include an outer segmented ring concentric with and located radially outwardly of the segmented intermediate ring and including annular outer ring segments and each of the outer ring segments including circumferentially stacked composite plies disposed within each of the intermediate ring segments between the substantially radially extending clockwise and counter-clockwise radial ply arms and radially outwardly of the annular bases.

The dovetail slots may flare out towards the bottoms.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
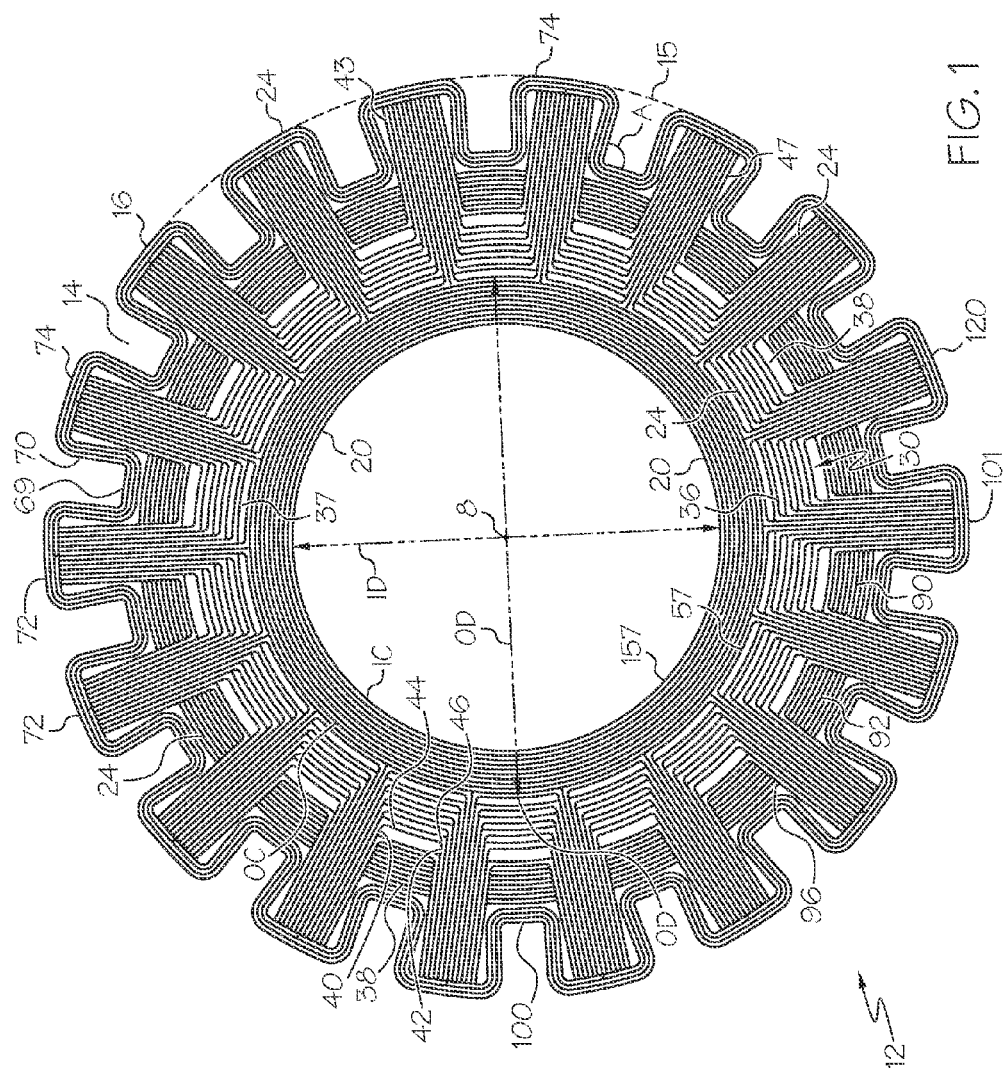
FIG. 1 is a cross-sectional diagrammatical view illustration of a gas turbine engine composite disk with slots between disk posts.

Illustrated in FIG. 1 is an exemplary gas turbine engine composite disk 12 circumscribed about an engine centerline axis 8. Dovetail slots 14 between disk posts 16 extend radially inwardly from a radially outer periphery 15 of the composite disk 12. The dovetail slots 14 include bottoms 69 extending circumferentially between substantially radially extending post sides 70 of adjoining ones 72 of the disk posts 16. Post tops 74 of the disk posts 16 extend between the post sides 70 and define the outer periphery 15 of the composite disk 12. The composite disk 12 is mostly made of composite layers or plies 24 which also illustrate a preform which is impregnated with resin and from which the composite is made.

Figure 2:
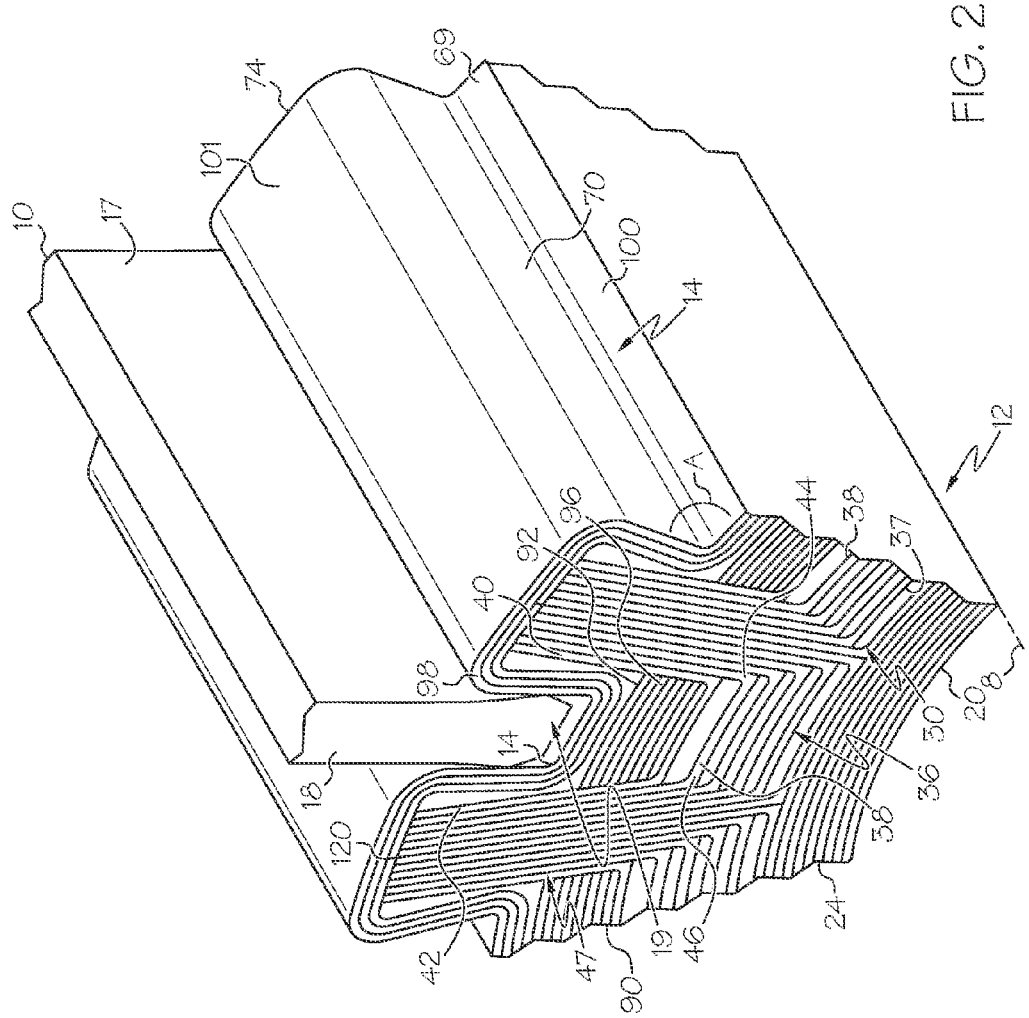
FIG. 2 is a perspective diagrammatical view illustration of a blade root disposed in a slot of the composite disk illustrated in FIG. 1.

FIG. 2 illustrates a portion of a blade 10 having an airfoil 17 attached to a splayed or outwardly flared dovetail root 18 of the blade 10. The dovetail root 18 is disposed in one of the dovetail slots 14. The dovetail roots 18 flare out circumferentially and are retained by mating flared out dovetail slots 14 at dovetail joints 19. The dovetail slots 14 flare out circumferentially towards the bottoms 69 of the dovetail slots 14. The dovetail slots 14 are bounded by the post sides 70 and the bottoms 69 and the post sides 70 are acutely angled with respect to the bottoms 69 as indicated by an acute angle A between them as illustrated in FIGS. 1 and 2.

Figure 3:
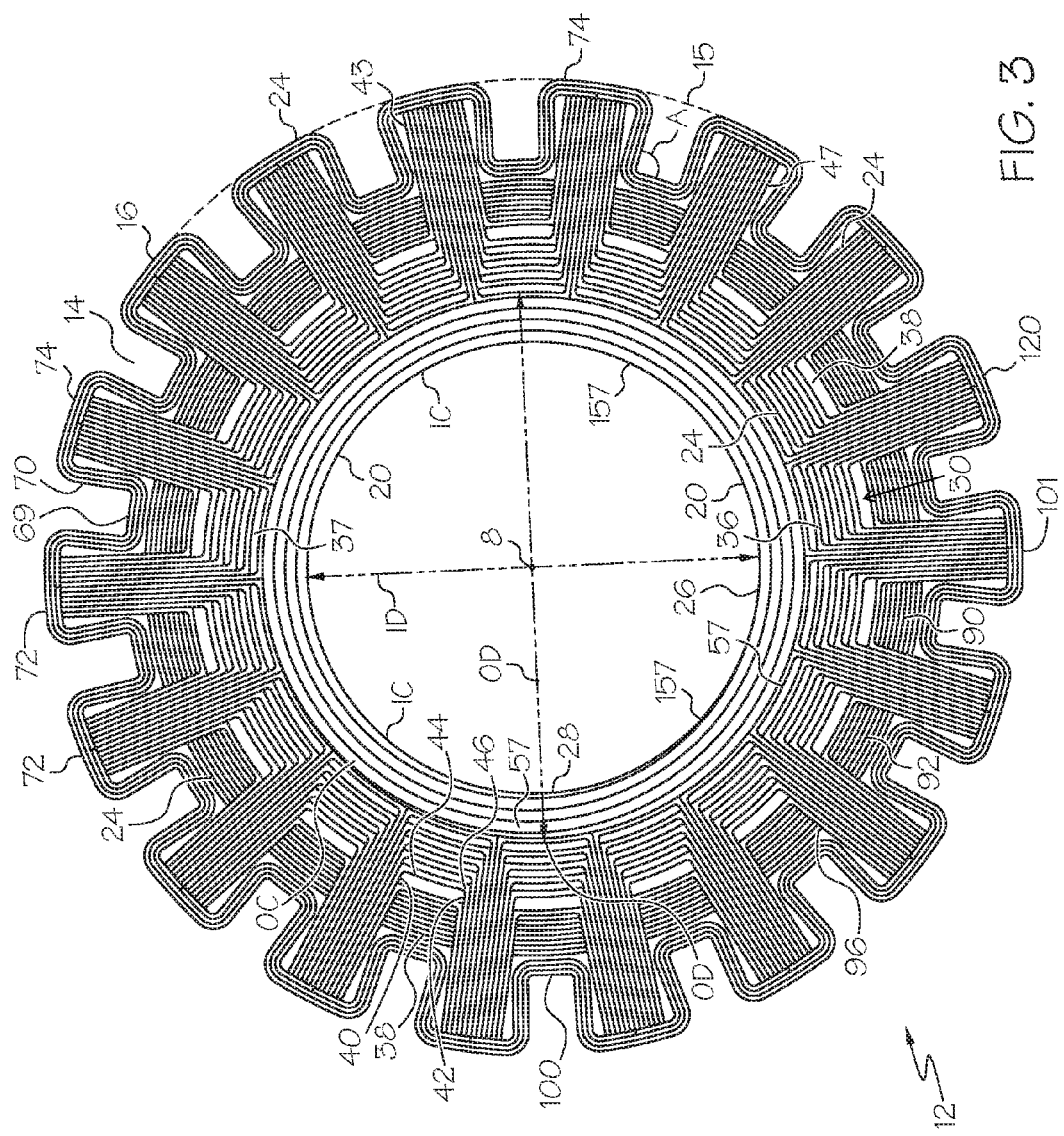
FIG. 3 is a cross-sectional diagrammatical view illustration an alternative gas turbine engine composite disk with annular composite layers or plies arranged in a spiral.

Referring to FIGS. 1 and 2, the composite disk 12 includes an inner or hub ring 20 of circular composite plies 24 circumscribed about the centerline axis 8. The composite plies 24 are concentric, annular, and circular in cross-section in the embodiment of the hub ring 20 illustrated in FIGS. 1 and 2. Illustrated in FIG. 3 is an alternative embodiment of the hub ring 20 including the annular composite layers or plies 24 arranged in a spiral 28 wound about the centerline axis 8. The spiral annular composite layers or plies 24 may be made by wrapping a continuous composite material 26 such as a tape around a mandrel or tool (not shown).

The composite material 26 is, at least in part, made from a carbon fiber woven material and is continuously wound 360 degrees as many times as there are plies 24. Thus, the spiral composite hub ring 20 is a single continuous wrap or spiral 28 and the composite plies 24 are substantially circular or annular. The composite hub ring 20 is substantially circular with hub outermost and hub innermost plies 57, 157 at outer and inner circumferences OC, IC or outer and inner diameters OD, ID respectively of the composite hub ring 20.

Referring to FIGS. 1 and 2, the composite disk 12 includes an intermediate ring 30 concentric with and located radially outwardly of the hub ring 20. The intermediate ring 30 is segmented and includes annular intermediate ring segments 36. Each intermediate ring segment 36 includes nested plies 37. Each of the nested plies 37 includes an annular base 38 and substantially radially extending clockwise and counter-clockwise radial ply arms 40, 42 at clockwise and counter-clockwise ends 44, 46 of the annular base 38. The annular bases 38 are disposed around an outermost layer or ply 57 of the hub ring 20. The annular bases 38 are disposed about, substantially concentric with, and preferably upon the outermost ply 57 of the hub ring 20. The hub ring 20, the annular bases 38, and the outermost ply 57 of the hub ring 20 are circumscribed about the centerline axis 8 and may be conical or cylindrical. The clockwise and counter-clockwise radial ply arms 40, 42 are illustrative of radial plies 43 in the composite disk 12 that strengthen the disk posts 16. The radial plies 43 counter the centrifugal force of the blades 10 and retains the dovetail root 18 of the blade 10 in the dovetail slots 14 when the disk 12 is rotating.

An outer ring 90 of the composite disk 12 is located radially outward of, and preferably adjacent to, the intermediate ring 30. The outer ring 90 is segmented and includes annular outer ring segments 92. Each outer ring segment 92 includes circumferentially stacked composite plies 96 disposed within each of the intermediate ring segments 36 and between the substantially radially extending clockwise and counter-clockwise radial ply arms 40, 42 and radially outwardly of the annular bases 38. The clockwise and counter-clockwise radial ply arms 40, 42 extend radially into the disk posts 16. In the exemplary embodiment of the composite disk 12 illustrated herein, all of the clockwise and counter-clockwise radial ply arms 40, 42 extend radially all of the way into the disk posts 16 to an outer skin 101. The outer skin 101 extends circumferentially around the composite disk 12 on the post tops 74 of the disk posts 16 and along the bottoms 69 of the dovetail slots 14. The outer skin 101 extends radially along the post sides 70 bounding the dovetail slots 14. A post portion 47 of each of the clockwise and counter-clockwise radial ply arms 40, 42 is disposed within and is a structural part of each one of the disk posts 16. The outer skin 101 includes one or more outermost composite covering plies 98 and covers the disk posts 16 and is disposed along the dovetail slot bottoms 69 extending circumferentially between the disk posts 16. The outer skin 101 covers the post tops 74 and the post sides 70 and bounds the dovetail slots 14 including the bottoms 69 of the dovetail slots 14.

The exemplary outermost composite covering plies 98 illustrated herein are made of the same composite material as the composite plies 24. The composite covering plies 98 cover the post portions 47 of the clockwise and counter-clockwise radial ply arms 40, 42 disposed within the disk posts 16. The covering plies 98 are disposed along slot surfaces 100 of the dovetail slots 14 and cover radial outer edges 120 of the clockwise and counter-clockwise radial ply arms 40, 42. The outermost composite covering plies 98 also cover the circumferentially stacked plies 96 of the outer ring segments 92. The outermost covering plies 98 completes and covers the disk posts 16 and the bottoms 69 of the dovetail slots 14 therebetween. The outermost covering plies 98 covers the tops 74 of the disk posts 16 defining the outer periphery 15 of the composite disk 12.

Figure 4:
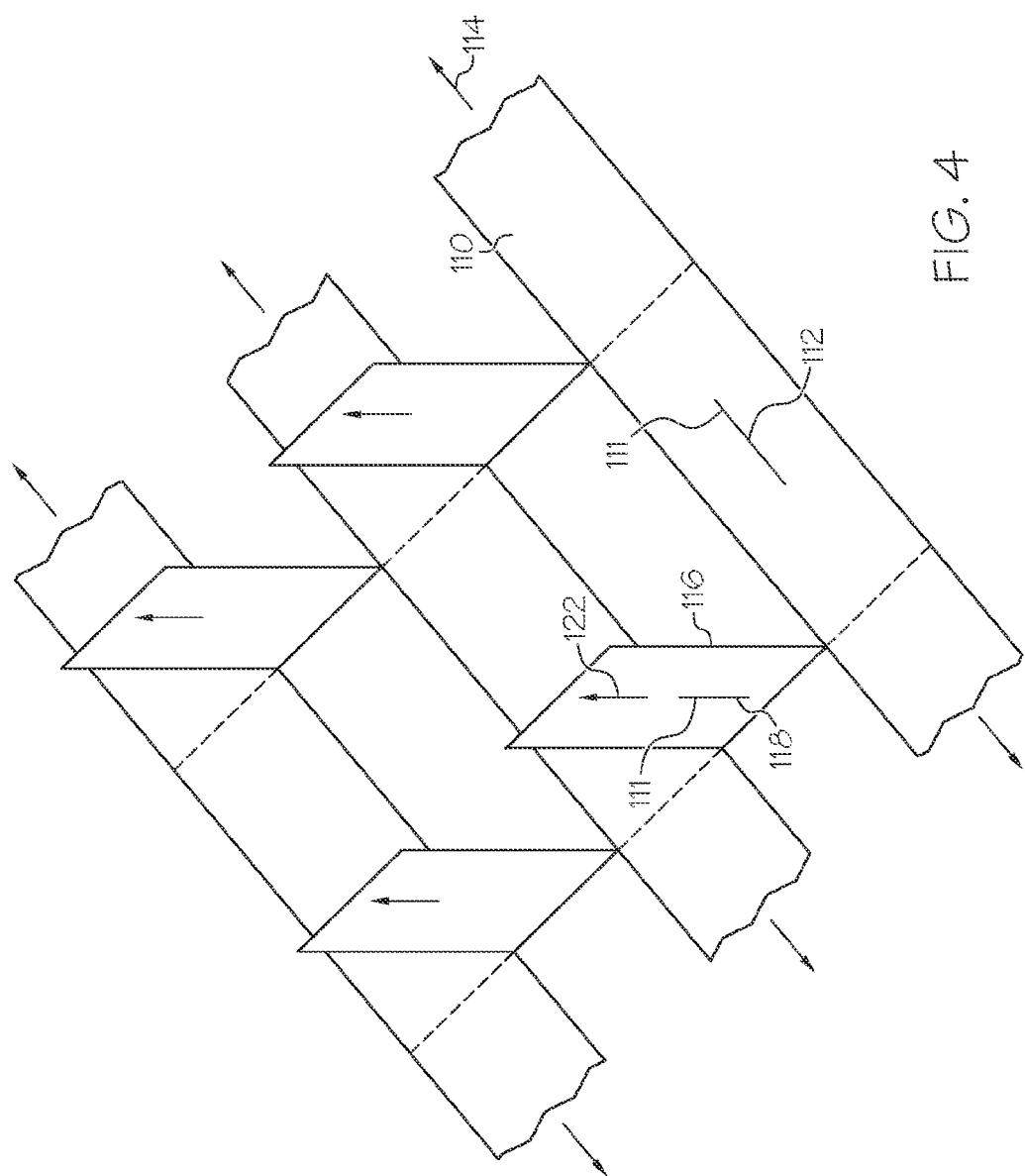
FIG. 4 is a perspective diagrammatical view illustration of fiber orientation in circumferential and radial directions in an area of the composite disk illustrated in FIGS. 1 and 2.

The composite plies 24 disclosed herein are made from directionally fibrous material which includes directional fibers 111 which are known to be strongest in tension. Therefore, the fibers in a given material are oriented in a single direction as indicated by arrows in FIG. 4. Circumferential composite plies 110 have circumferentially oriented fibers 112 indicated by circumferentially oriented arrows 114 and radial composite plies 116 have radially oriented fibers 118 indicated by radially oriented arrows 122. Examples of directionally fibrous material include unitape, braid, or preferentially directional material. The radially oriented fibers 118 in the clockwise and counter-clockwise radial ply arms 40, 42 in the disk posts 16 are interlocked with the circumferentially oriented fibers 112 in the annular bases 38. This provides structural integrity of the composite disk 12 under loading during engine operation.

The unidirectional tape or material used herein is embedded in an epoxy resin matrix. A discussion of this and other suitable materials may be found in the "Engineering Materials Handbook" by ASM INTERNATIONAL, 1987, 1989 or later editions. The composite disks disclosed herein are made from a non-metallic type of material containing a fiber such as a carbonaceous, silica, metal, metal oxide, or ceramic fiber embedded in a resin material such as Epoxy, PMR15, BMI, PEEK, etc. The fibers are unidirectionally aligned in a material or tape that is impregnated with a resin, formed into a part shape, and cured via an autoclaving process or press molding to form a light-weight, stiff, relatively homogeneous article having laminates or plies within. Unidirectional fiber filament ply material such as unitape may be used.

Various methods may be utilized to inject resin into a woven composite preform such as represented by the composite disk 12 illustrated in FIG. 1. Injecting the preform with resin may be performed using resin transfer molding (RTM) or vacuum-assisted resin transfer molding (VARTM) while the preform is layed up on a tool system. Alternatively, a more conventional autoclaving process may be used. When the preform is placed in the mold, various mold parts or sections hold the preform in place to properly form the structure.

RTM methods use RTM molds to deliver smooth surface finish on both sides of the part and can produce complex, detailed, near net shapes at a high rate with minimal post production trimming and/or machining. The resin is delivered under pressure with the mold pieces clamped together (or held together in a press) and, thus, parts are consistent, repeatable, dimensionally stable and well consolidated, with relatively high fiber content and excellent void control. For high performance parts made with higher viscosity toughened resins, molds are usually heated and resin injection pressure is controlled with a meter/mix injection machine. Raw material costs are generally less than those for hand layup because dry preforms are used rather than traditional prepregs. Cycle time can range from two to three hours which is shorter than typical autoclave cure cycles. After the composite disk 12 has been formed using RTM or VARTM, it is in net shape or near net shape condition. Machining and/or surface finishing may be used to produce the final component.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine composite disk comprising:
   dovetail slots between disk posts extending radially inwardly from a radially outer periphery of the composite disk;
   a hub ring of composite plies circumscribed about a centerline axis;
   radial plies extending radially away from the hub ring and into the disk posts; and
   a segmented intermediate ring concentric with and located radially outwardly of the hub ring;
   further comprising an outer skin including one or more outermost composite covering plies extending circumferentially around the composite disk, covering the disk posts, and bounding the dovetail slots therebetween.

2. The composite disk as claimed in claim 1,
   further comprising the composite plies wrapped in a spiral or the composite plies being concentric, annular, and circular in cross-section.

3. A gas turbine engine composite disk comprising:
   dovetail slots between disk posts extending radially inwardly from a radially outer periphery of the composite disk;
   a hub ring of composite plies circumscribed about a centerline axis;
   radial plies extending radially away from the hub ring and into the disk posts; and
   a segmented intermediate ring concentric with and located radially outwardly of the hub ring;
   wherein the segmented intermediate ring comprises annular intermediate ring segments,
   each of the intermediate ring segments including nested plies, and
   each of the nested plies including an annular base circumscribed about the centerline axis and substantially radially extending clockwise and counter-clockwise radial ply arms at clockwise and counter-clockwise ends of the annular base wherein the radial plies include the clockwise and counter-clockwise radial ply arms.

4. The composite disk as claimed in claim 3, further comprising the composite plies wrapped in a spiral or the composite plies being concentric, annular, and circular in cross-section.

5. The composite disk as claimed in claim 3, further comprising an outer skin including one or more outermost composite covering plies extending circumferentially around the composite disk, covering the disk posts, and bounding the dovetail slots therebetween and the outer skin covering radial outer edges of the clockwise and counter-clockwise radial ply arms.

6. The composite disk as claimed in claim 5, further comprising:
   circumferential composite plies in the hub ring, the annular base, and the outer skin covering post tops of the disk posts and bottoms of the dovetail slots;
   the circumferential composite plies including circumferentially oriented fibers;
   radial composite plies in the clockwise and counter-clockwise radial ply arms and the outer skin along radially extending post sides of the disk posts bounding the dovetail slots; and
   the radial composite plies including radially oriented fibers.

7. The composite disk as claimed in claim 3, further comprising:
   an outer segmented ring concentric with and located radially outwardly of the segmented intermediate ring,
   the outer segmented ring including annular outer ring segments, and
   each of the outer ring segments including circumferentially stacked composite plies disposed within each of the intermediate ring segments between the substantially radially extending clockwise and counter-clockwise radial ply arms and radially outwardly of the annular bases.

8. The composite disk as claimed in claim 7, further comprising:
   an outer skin including one or more outermost composite covering plies extending circumferentially around the composite disk;
   the outer skin covering the outer ring segments and the disk posts and bounding the dovetail slots therebetween; and
   the outer skin covering radial outer edges of the clockwise and counter-clockwise radial ply arms.

9. The composite disk as claimed in claim 8, further comprising:
   circumferential composite plies in the hub ring, the annular base, and the outer skin covering post tops of the disk posts and bottoms of the dovetail slots;
   the circumferential composite plies including circumferentially oriented fibers;
   radial composite plies in the clockwise and counter-clockwise radial ply arms and the outer skin along radially extending post sides of the disk posts bounding the dovetail slots; and
   the radial composite plies including radially oriented fibers.

10. The composite disk as claimed in claim 9, further comprising the dovetail slots flaring out towards the bottoms.

11. A gas turbine engine composite disk and blade assembly comprising:
    a composite disk including dovetail slots between disk posts extending radially inwardly from a radially outer periphery of the composite disk,
    the dovetail slots including bottoms between disk posts,
    blades having airfoils attached to outwardly flared dovetail roots,
    the dovetail roots disposed in the dovetail slots,
    the dovetail roots retained in the mating flared out dovetail slots,
    a hub ring of composite plies circumscribed about a centerline axis, and
    radial plies extending radially away from the hub ring and into the disk posts.

12. The assembly as claimed in claim 11, further comprising the composite plies wrapped in a spiral or the composite plies being concentric, annular, and circular in cross-section.

13. The assembly as claimed in claim 11, further comprising an outer skin including one or more outermost composite covering plies extending circumferentially around the composite disk, covering the disk posts, and bounding the dovetail slots therebetween.

14. The assembly as claimed in claim 11, further comprising:
- a segmented intermediate ring concentric with and located radially outwardly of the hub ring,
- the intermediate ring including annular intermediate ring segments,
- each of the intermediate ring segments including nested plies, and
- each of the nested plies including an annular base circumscribed about the centerline axis and substantially radially extending clockwise and counter-clockwise radial ply arms at clockwise and counter-clockwise ends of the annular base wherein the radial plies include the clockwise and counter-clockwise radial ply arms.

15. The assembly as claimed in claim 14, further comprising an outer skin including one or more outermost composite covering plies extending circumferentially around the composite disk, covering the disk posts, and bounding the dovetail slots therebetween and the outer skin covering radial outer edges of the clockwise and counter-clockwise radial ply arms.

16. The assembly as claimed in claim 15, further comprising:
- circumferential composite plies in the hub ring, the annular base, and the outer skin covering post tops of the disk posts and the bottoms of the dovetail slots;
- the circumferential composite plies including circumferentially oriented fibers;
- radial composite plies in the clockwise and counter-clockwise radial ply arms and the outer skin along radially extending post sides of the disk posts bounding the dovetail slots; and
- the radial composite plies including radially oriented fibers.

17. The assembly as claimed in claim 14, further comprising:
- an outer segmented ring concentric with and located radially outwardly of the segmented intermediate ring,
- the outer segmented ring including annular outer ring segments, and
- each of the outer ring segments including circumferentially stacked composite plies disposed within each of the intermediate ring segments between the substantially radially extending clockwise and counter-clockwise radial ply arms and radially outwardly of the annular bases.

18. The assembly as claimed in claim 17, further comprising:
- an outer skin including one or more outermost composite covering plies extending circumferentially around the composite disk;
- the outer skin covering the outer ring segments and the disk posts and bounding the dovetail slots therebetween; and
- the outer skin covering radial outer edges of the clockwise and counter-clockwise radial ply arms.

19. The assembly as claimed in claim 18, further comprising:
- circumferential composite plies in the hub ring, the annular base, and the outer skin covering post tops of the disk posts and bottoms of the dovetail slots;
- the circumferential composite plies including circumferentially oriented fibers;
- radial composite plies in the clockwise and counter-clockwise radial ply arms and the outer skin along radially extending post sides of the disk posts bounding the dovetail slots; and
- the radial composite plies including radially oriented fibers.

20. The assembly as claimed in claim 19, further comprising the dovetail slots flaring out towards the bottoms.

* * * * *